United States Patent
Haneda

[19]

[11] Patent Number: 6,011,575
[45] Date of Patent: Jan. 4, 2000

[54] IMAGE FORMING APPARATUS WITH LINE-SHAPED IMAGE EXPOSURE MEANS

[75] Inventor: Satoshi Haneda, Hachioji, Japan

[73] Assignee: Konica Corporation, Tokyo, Japan

[21] Appl. No.: 08/923,243

[22] Filed: Sep. 4, 1997

[30] Foreign Application Priority Data

Sep. 10, 1996 [JP] Japan .................................... 8-238977

[51] Int. Cl.[7] ............................... B41J 2/385; B41J 2/45; B41J 2/47; G01D 15/14
[52] U.S. Cl. ........................... 347/238; 347/118; 347/241
[58] Field of Search ..................................... 347/232, 238, 347/115, 236, 117, 118, 172, 173, 43; 257/93, 94, 103, 89; 438/22, 23, 28, 29, 30, 68; 29/469; 250/330–332; 445/22, 24

[56] References Cited

U.S. PATENT DOCUMENTS

| | | | |
|---|---|---|---|
| 4,587,717 | 5/1986 | Daniele et al. | 438/21 |
| 4,903,142 | 2/1990 | Hasebe et al. | 358/457 |
| 4,907,034 | 3/1990 | Doi et al. | 347/232 |
| 4,918,465 | 4/1990 | Morita | 347/232 |
| 4,936,808 | 6/1990 | Lee | 445/24 |
| 4,982,203 | 1/1991 | Uebbing et al. | 347/236 |
| 5,173,759 | 12/1992 | Murano | 257/88 |
| 5,357,354 | 10/1994 | Matsunawa et al. | 358/530 |
| 5,444,525 | 8/1995 | Takahashi et al. | 347/115 |
| 5,510,633 | 4/1996 | Orlowski et al. | 257/93 |
| 5,691,760 | 11/1997 | Hosier et al. | 347/238 |
| 5,719,680 | 2/1998 | Yoshida et al. | 358/296 |

*Primary Examiner*—N. Le
*Assistant Examiner*—L. Anderson
*Attorney, Agent, or Firm*—Frishaufn Holtz, Goodman, Langer & Chick, P. C.

[57] ABSTRACT

In an image forming apparatus, an image is formed pixel by pixel for each image data on a photoreceptor, wherein each pixel has a maximum recording width. A plurality of light emitting elements are aligned in an array form and each light emitting element is mounted with a setting width, wherein each light emitting element has a mount-shaped light amount distribution curve in which light amount data spread to both sides of a peak corresponding to the maximum light amount. Each pixel is divided into plural small pixels. Each small pixel is provided with a light emitting element so that an image is formed in the maximum recording width of each pixel by plural neighboring light emitting elements in accordance with image data of each pixel, wherein the image forming width at the light amount of 50% of the maximum light amount of each light emitting element is wider than the setting width of the light emitting element and is narrower than the maximum recording width of each pixel.

10 Claims, 14 Drawing Sheets

FIG. 1 (a)
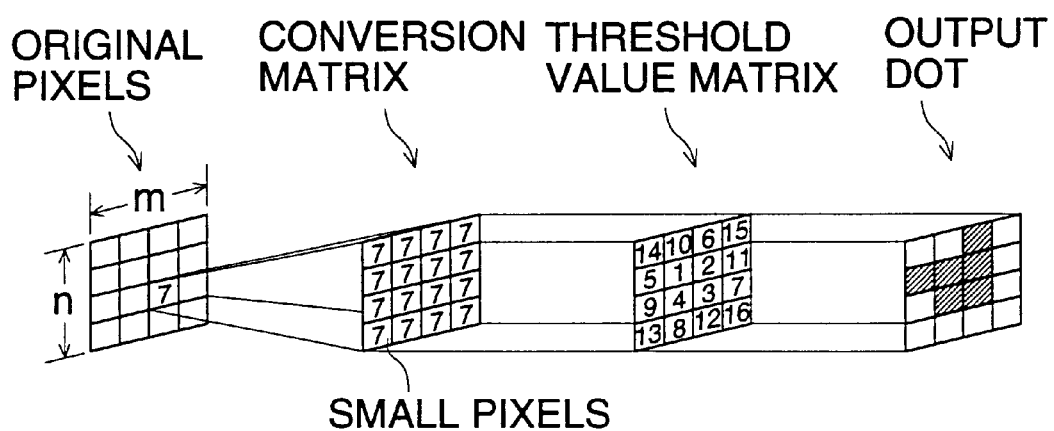
FIG. 1 (b)
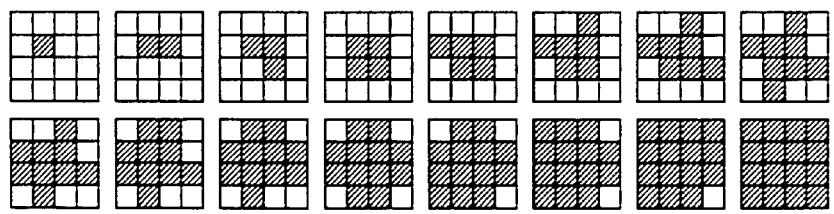
DOT CONVERGENCE TYPE
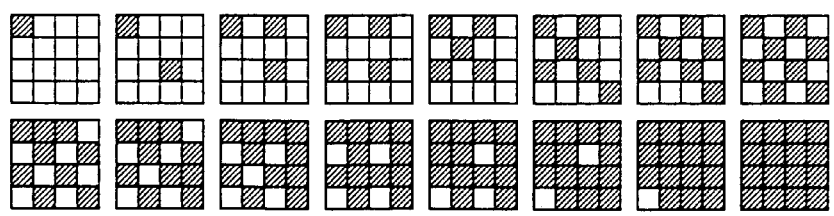
DOT DIVERGENCE TYPE

IMAGE FORMING APPARATUS WITH LINE-SHAPED IMAGE EXPOSURE MEANS

BACKGROUND OF THE INVENTION

The present invention relates to an electrophotographic image forming apparatus wherein a line-shaped image exposure means such as an LED, FL OR EL head and a developing means are located in the vicinity of an image forming body and thereby a toner image is formed on aforesaid image forming body.

An image forming apparatus such as a laser printer can operate by employing a writing system to conduct scanning by means of a laser beam as an image exposure means based on an image-preparation theory by means of an electrophotographic process.

Generally, there are two scanning methods by means of laser beams. One is a method in which laser beams emitted from a laser emitting element are changed to be a parallel beam through a collimator lens and aforesaid parallel beam is reflected by means of a polygonal mirror. Aforesaid scanning beam is caused to pass through an f-θ lens and a cylindrical lens to conduct image exposure on an image forming body which moves (secondary scanning) perpendicularly to the scanning direction so that a latent image is formed. The other method is one in which image exposure is conducted on an image forming body which is composed of an emission element such as an array-shaped LED and an image-forming element such as a Selfoc lens and which moves perpendicular with aforesaid array. Since the image exposure means employing the array-shaped emission element is compact due to no moving portion, it is frequently used in a color image forming apparatus in the vicinity of an image forming body in which plural image exposure means are provided and the array-shaped emission elements conduct image exposure corresponding to multiple colors such as Y, M, C and K.

In an array-shaped exposure optical system in which FL, EL or LED elements are arranged in a line, if an image is formed by means of multiple value modulation employing an LED array as an example in which the LED is arranged linearly, uneven streaking and uneven light amounts are caused due to arrangement error of each chip (an emission unit) inside the array. In addition, when plural LED arrays are provided in the vicinity of the image forming body so that multiple color toner images are superposed on the image forming body, alignment between each LED array is extremely difficult.

SUMMARY OF THE INVENTION

An object of the present invention is to provide an image forming apparatus in which uneven positional accuracy and uneven emission which occur during assembly the chips of the above array or among the arrays are decreased and a multiple-value latent image having no unevenness is formed.

PROBLEM

In an image forming apparatus which is provided with light emitting elements arranged in a form of an array in the vicinity of an image forming member and image focusing elements and conducts image exposure on the rotating image forming member, the above object can be attained by the image forming apparatus characterized by comprising control means for composing a recording unit (or a pixel) by plural neighboring light emitting elements and for controlling the plural neighboring light emitting elements based on a single image data so as to form an image in the recording unit, wherein an image forming width of a light emission unit (or a single light emitting element) at 50% of the maximum light amount in the light amount distribution of the light emission unit is wider than a setting width of the light emission unit and narrower than a recording width of the recording unit.

It is a preferable embodiment that the above-mentioned image forming apparatus has plural exposure optical systems and is applied to an image forming apparatus having a means for shifting image data in the primary scanning direction and/or a secondary scanning direction. Due to the present embodiment, excellent color images having neither uneven color nor uneven light amounts can be obtained.

BRIEF EXPLANATION OF DRAWINGS

FIGS. 1(a) and 1(b) show explanation drawings of a density pattern method.

DETAILED DESCRIPTION OF THE PREFERRED EMBODIMENT

Figure 12:
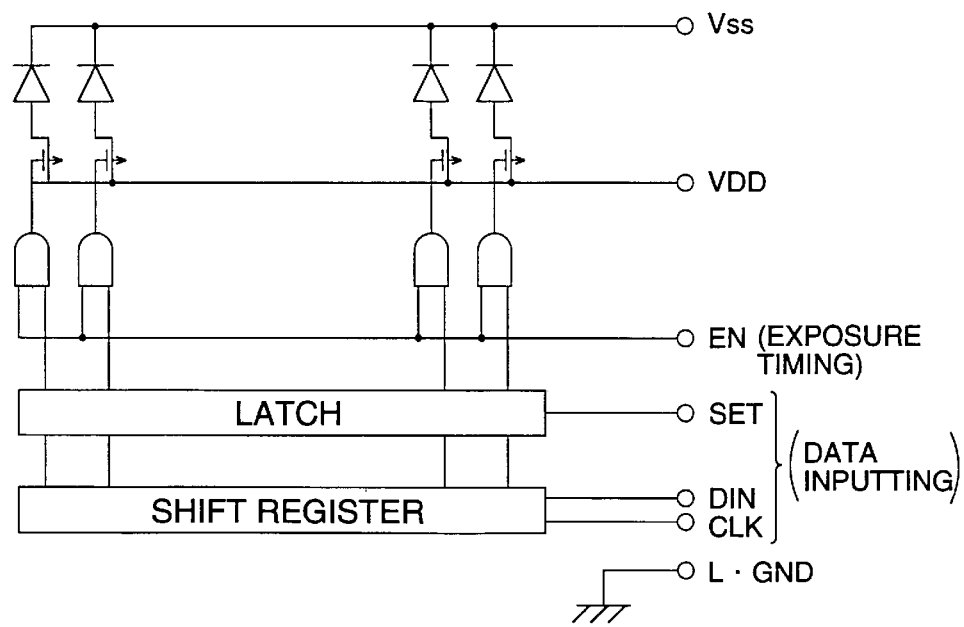
FIG. 12 shows an equivalent circuit drawing of the LED array.

The LED array in which LEDs are arranged linearly has a constitution as shown in FIG. 12 as an equivalent circuit. In front of each LED emission element (emission unit), a Selfoc lens (brand name) is provided. In the present invention, with regard to the exposure optical system which image-forms on the image forming body, the image forming width at 0.5 of the maximum light amount is wider than the mounted width of the emission unit and narrower than the recording width of the recording unit formed by a density pattern method. Here, "0.5 of the maximum light amount" is defined to be the spread of light at a light amount of 0.5 when the maximum light amount in the mount-shaped light amount distribution when one LED is emitted, is assumed as 1 shown in FIGS. 2(a) and 2(b).

As shown in FIG. 1(a), the density pattern method compares the m×n threshold value matrix with an image data of each original pixel and thereby represents each pixel with plural area patterns formed by plural small pixels. Generally, its spatial frequency characteristics are divided into a dot convergence type in which the threshold matrix successively expands from the center as the core and thereby the spatial frequency becomes low frequency as much as possible and a dot divergence type in which it is so structured that the spatial frequency is dispersed as much as possible and thereby the spatial frequency becomes high frequency. FIG. 1(b) shows an outputting example when aforesaid two types are structured with 4×4 matrix.

Figure 2:
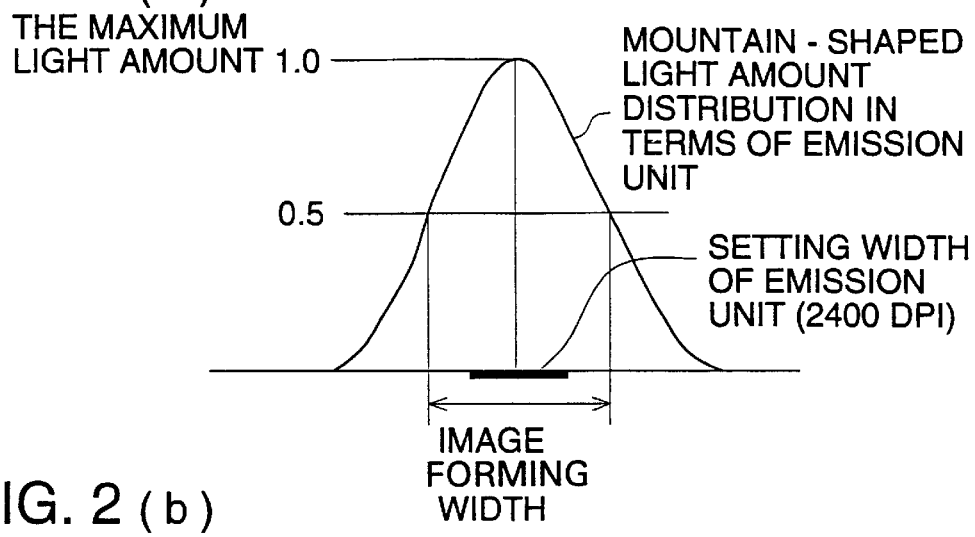
FIGS. 2(a), 2(b) and 2(c) are explanation drawings showing exposure properties of the exposure optical system of the present invention.
Figure 2:
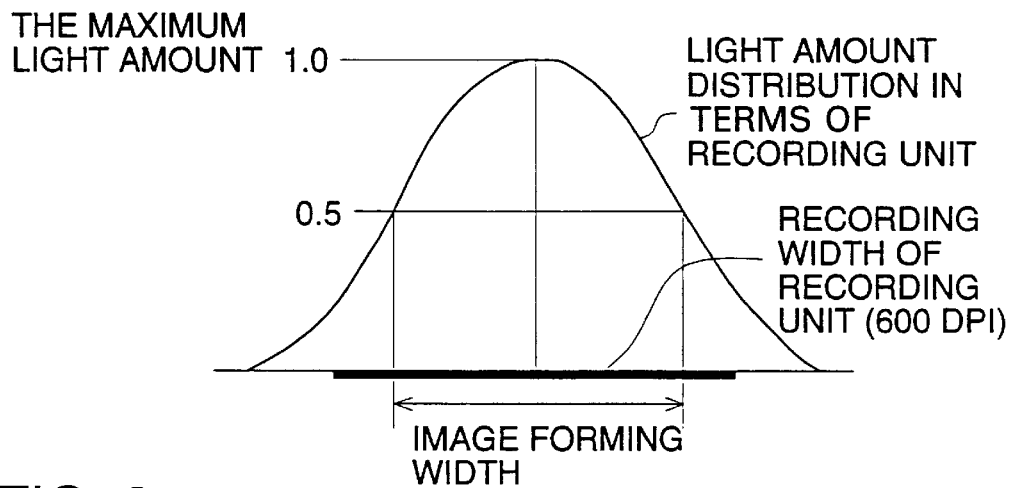
Figure 2:
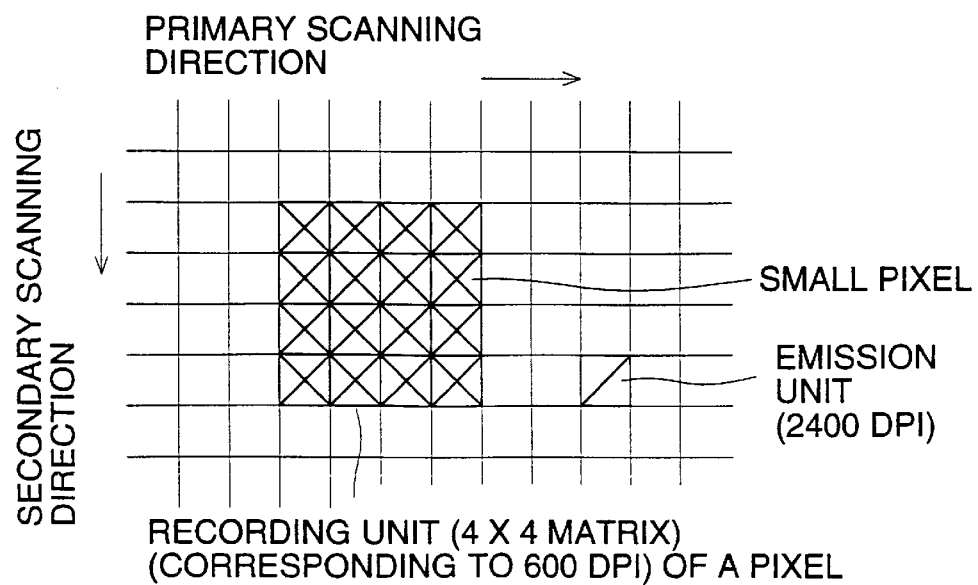

With regard to image exposure onto the image forming body of the present invention, the image forming width of the emission unit at of the maximum light amount 0.5 is wider than the mounted width of the emission unit, as shown in FIG. 2(a). Due to this, even if correction of positional deviation or light amount is conducted at the emission unit, the results are not prominent in terms of image quality. With regard to recording unit due to the density pattern method, the image forming width of emission unit at of the maximum light amount 0.5 is narrower than the recording width of the recording unit. Due to this, each dot, i.e., the recording unit is vividly recorded. FIG. 2(b) shows such a situation.

By applying the above-mentioned conditions to high density LED arrays, it is possible to conduct regulation on positional deviation and light amount at the recording unit and the fine emission unit. Therefore, in terms of the recording units, uneven positional accuracy and uneven occurrence are decreased. Therefore, a multi-value latent image having no unevenness is formed.

FIG. 2(c) shows a situation in which a 2400 dpi LED array is used and a vivid multi-value latent image corresponding to 600 dpi is formed due to 4×4 matrix.

Figure 3:
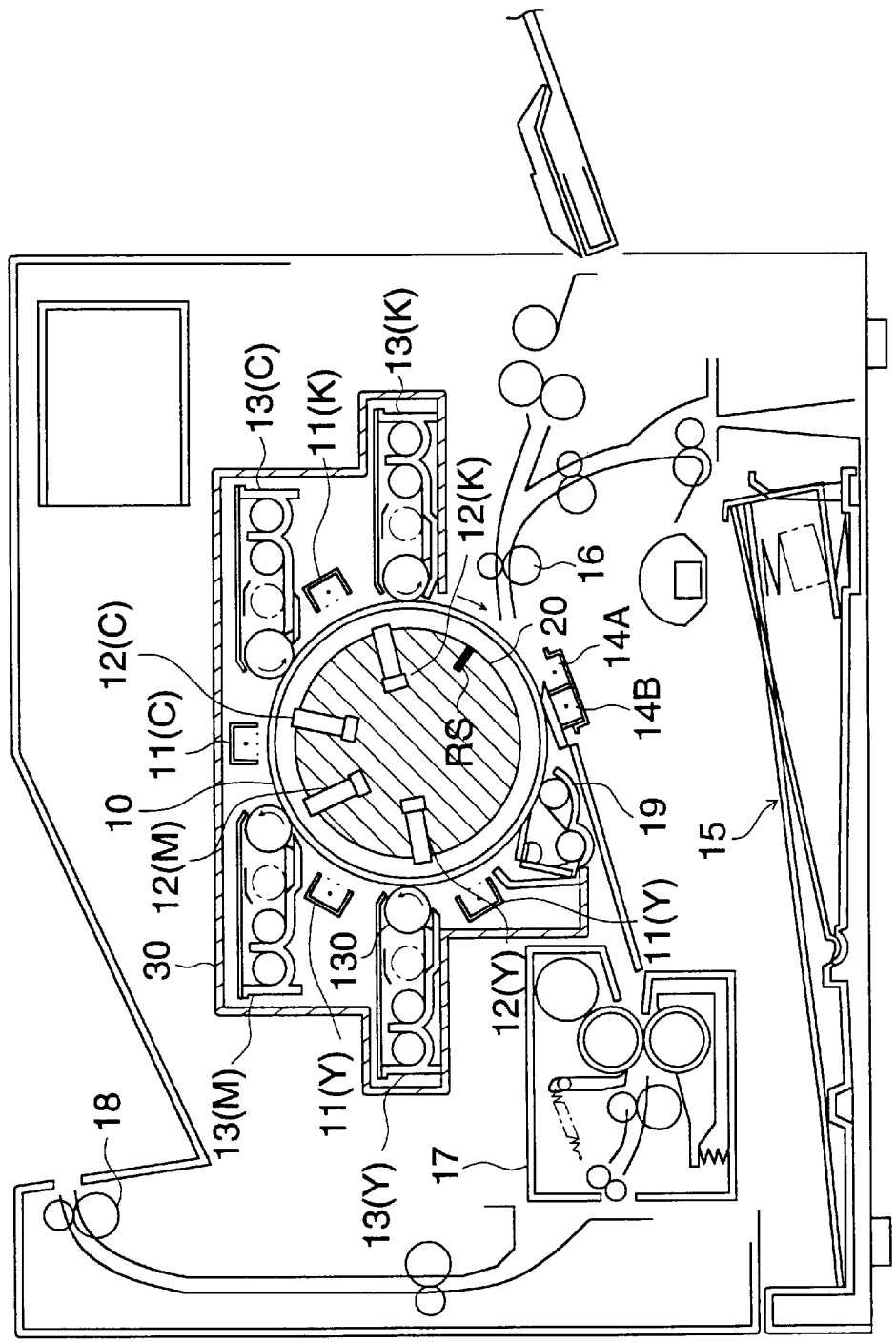
FIG. 3 is a cross sectional view of an example of an image forming apparatus of the present invention.
Figure 4:
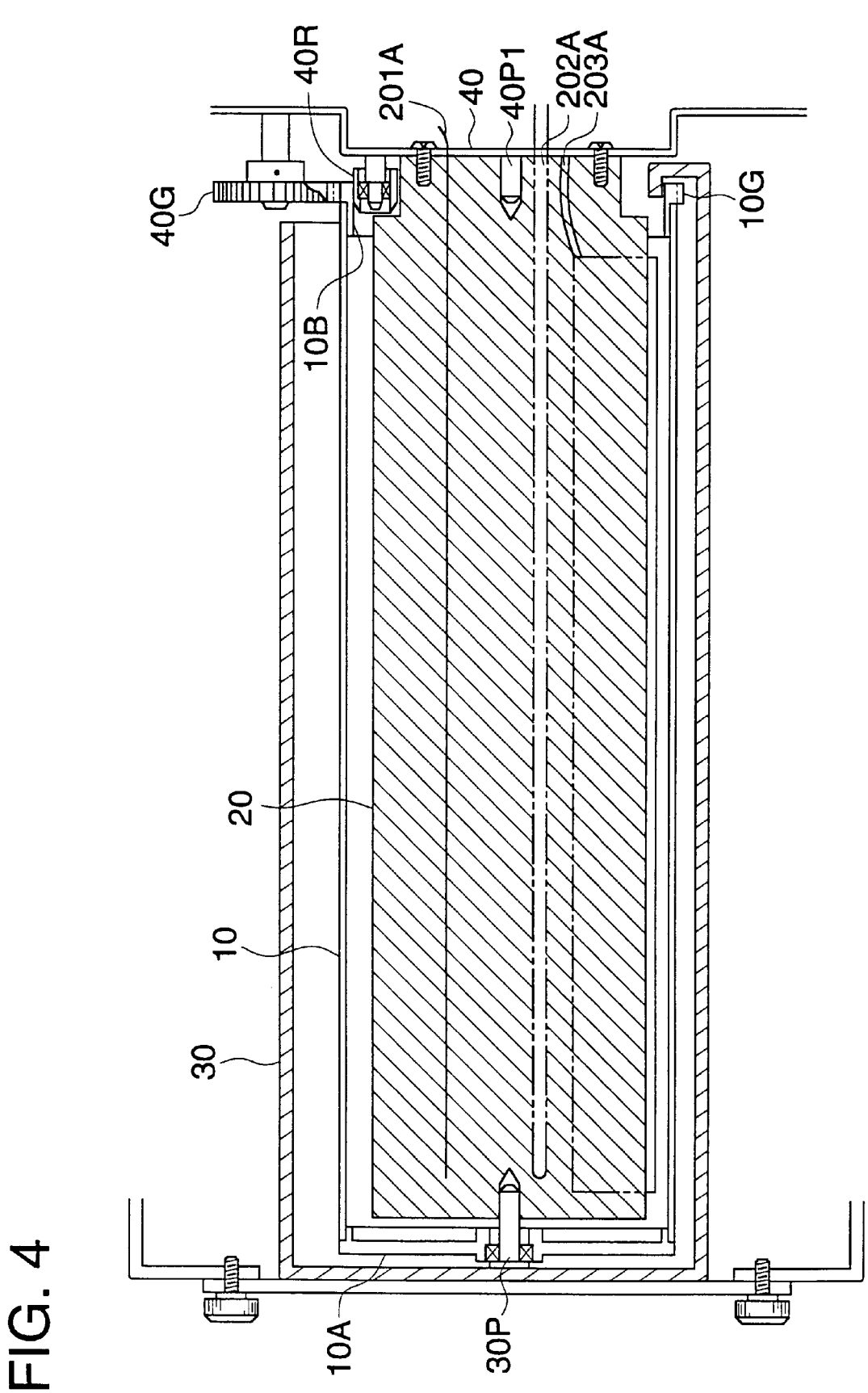
FIG. 4 is a main portion cross sectional view showing an example of an image forming apparatus of the present invention.

Next, the constitution of an example of a color image forming apparatus which conducts color image formation employing plural of the above-mentioned image exposure means, referring to FIGS. 3 and 4.

Numeral 10 shows a drum-shaped image forming body, i.e., a photoreceptor drum, in which on the cylindrical substrate circumference formed by a transparent member such as optical glass or a transparent acrylic resin, a transparent conductive layer and an organic photoreceptor layer (OPC) are coated.

In the above-mentioned photoreceptor drum 10, flange 10A on one end thereof is supported with a bearing by means of guide pin 30P provided in cartridge 30 described later. Flange 10B on the other end is engaged with plural guide roller 40R provided by board 40 on the apparatus main body so that external gear 10G is caused to be engaged with driving gear 40G. Due to aforesaid power, the above-mentioned grounded transparent conductive layer is rotated clockwise.

Numeral 11 represents a scorotron charger (hereinafter, simply referred to as a charger), in which charging is conducted by means of corona discharge using a grid and a discharging wire whose potential is kept to a prescribed value on the above-mentioned organic photoreceptor layer so uniform potential is provided to photoreceptor drum 10.

Numeral 12 represents an exposure optical system composed of an LED array arranged in the axis direction of photoreceptor drum 10 and a Selfoc lens. Image signals of each color, read by an integral image reading apparatus, are successively taken up from the memory so that aforesaid image signals are inputted into each of the above-mentioned exposure optical systems 12 as electrical signals.

Each of the above-mentioned exposure optical system 12 is housed inside the substrate inside the above-mentioned photoreceptor drum 10, in which each of exposure optical systems 12 is mounted on circular or poligonal-shaped supporting member 20 which is fixed on board 40 on the apparatus main body with guide pin 40P1 as a guide.

13Y–13K represent developing devices which house yellow (Y), magenta (M), cyan (C) and black (K) developer. All of them are provided with development sleeves 130, all of which rotate in the same direction near the surface of photoreceptor drum 10 while keeping a prescribed gap with it.

Each of the above-mentioned developing devices reversibly develops an electrostatic latent image on photoreceptor drum 10 formed by means of charging by the above-mentioned charger 11 and image exposure by exposure optical system 12 by means of impressing of a development bias voltage.

Next, the processes of a color image forming apparatus in the present apparatus will be explained.

With regard to an original image, in an integral image reading apparatus, an image read by an image sensor or an image edited by a computer is temporarily stored in the memory as an image signal for each of Y, M, C and K colors and is subsequently re-loaded.

When image recording is started, and due to activation of the driving motor of the photoreceptor, the above-mentioned driving gear 40G rotates so that photoreceptor drum 10 is caused to be rotated in a clockwise direction. Simultaneously, due to charging effect by charging device 11(Y), provision of potential onto photoreceptor drum 10 starts.

After photoreceptor drum 10 is provided with potential, in the above-mentioned exposure optical system 12(Y), exposure is started by means of an electrical signal which corresponds to the first color signal, i.e., a yellow (Y) image signal, in which, due to the rotation scanning of the drum, an electrostatic latent image, which corresponds to the yellow (Y) image is formed on the light-sensitive layer on the surface of aforesaid drum.

The above-mentioned latent image is reversibly developed by means of a developer in the developing sleeve on developing device 13(Y) and thereby a yellow (Y) toner image is formed in accordance with rotation of photoreceptor drum 10.

Next, photoreceptor drum 10 is provided with potential on the above-mentioned yellow (Y) toner image due to charging effect by charger 11(M). Exposure is then conducted by means of an electrical signal, which corresponds to the second color signal, i.e., magenta image signal in exposure optical system 12(M). By means of non-contact reversal development using developing device 13(M), the magenta (M) toner image is successively superposed on the above-mentioned yellow (Y) toner image and to form.

Due to the same process, by means of charger 11(C), exposure optical system 12(C) and developing device 13(C), a cyan (C) toner image which corresponds to the third color signal is successively superposed on the previous yellow and magenta images. By means of charger 11(K), exposure optical system 12(K) and developing device 13(K), a cyan (K) toner image which corresponds to the fourth color signal is successively superposed. Thus, within one rotation of photoreceptor drum 10, a color toner image is formed on the circumference thereof.

The above-mentioned exposure on an organic photosensitive layer on photoreceptor drum 10 by means of each of the exposure optical systems is conducted from inside of the drum through a transparent substrate. Therefore, all of image exposure which correspond to the second, third and fourth color signals are barely influenced by the initially formed toner image. An electrostatic latent image which is almost equivalent to an image which corresponds to the first color signal can be formed. In order to stabilize the temperature and prevent an increase of temperature inside photoreceptor drum 10 due to heating by each of the exposure optical systems 12, materials having favorable heat transmissivity are used for supporting member 20. When the temperature is too low, heater 201A is employed. When temperature is too high, heat is released to the outside of the apparatus through heat pipe 202A. Therefore, the temperature can be regulated to such an extent which does not hinder the operation of the apparatus. In addition, when the development effects by means of each of the developing devices is conducted, DC or DC and AC developing bias is impressed to each developing sleeve. Therefore, "jumping development" by means of a one-component or two-component developer which is housed in a developing device is conducted. Accordingly, non-contact reversal development is conducted in the transparent conductive layer which is coated on grounded photoreceptor drum 10 is grounded.

Color toner image formed on circumference of photoreceptor drum 10 is transferred to a recording paper which is conveyed by paper feeding cassette 15 at transfer device 14A, all of which are synchronized with the driving of timing roller 16.

The recording paper on which a toner image has been transferred is subjected to charge removal at discharger 14B. The recording paper is separated from the circumferential surface of the drum and toner is adhered thereon at fixing device 17. Following this, through paper discharging rollers 18, aforesaid recording paper is discharged onto a tray located at the top the apparatus.

In a color image forming apparatus in which the above-mentioned plural image exposure means are used, images are formed within one rotation of the photoreceptor drum and images are collectively transferred, image exposure means used are different for each color. Therefore, color deviation and color stain occur due to inclination and curve of the image exposure means and deviation of the mounted position. Since color deviation and stain are easily observed (about 0.03 mm), practical problems occur. If linearity or orientation is not aligned between each LED array, deviation occurs on the toner image superposed. Accordingly, color deviation or color stain occurs on the image. As a result, color image quality is extremely deteriorated. Next, a technological means and a control method will be explained in which the linearity and the orientation of each LED array are accurately aligned by dividing each LED in the primary scanning direction and by controlling exposure timing and thereby color deviation and color stain are eliminated.

Figure 10:
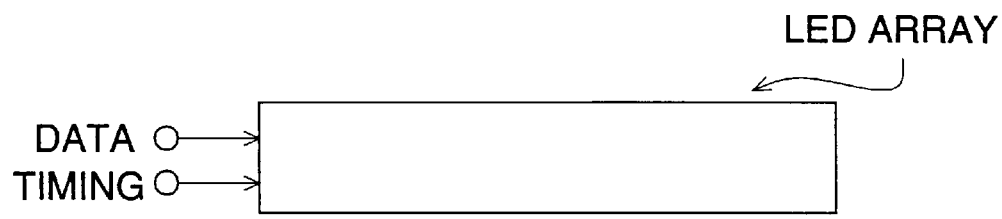
FIGS. 10(a), 10(b) and 10(c) are explanatory sketches showing a control system of conventional exposure timing.
Figure 10:
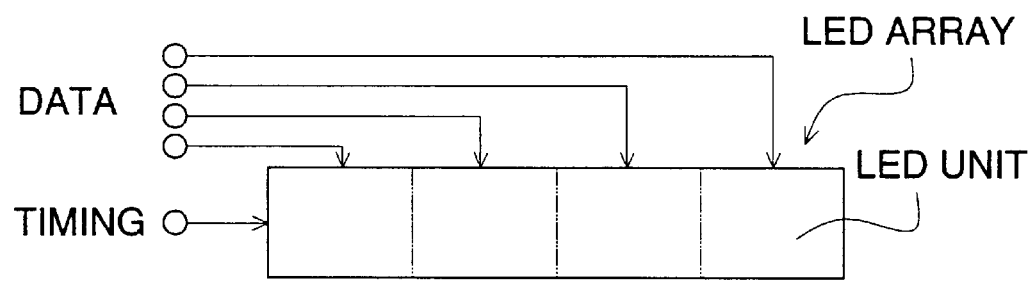
Figure 10:
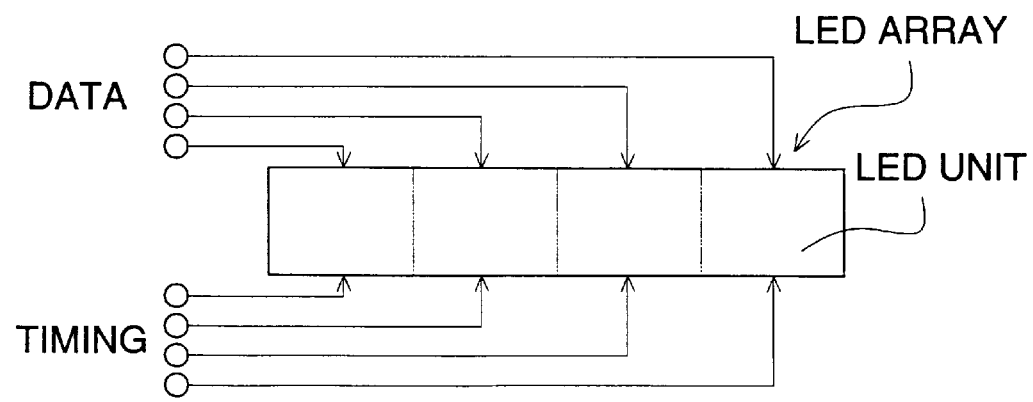

As explained previously, the LED array in which individual LEDs are linearly arranged is structured as shown in FIG. 12 as an equivalent circuit. When the LED array is used as the image exposure means, it is ordinary that the timing between the transfer of image data and image exposure is simultaneous all through the entire LED area. In order to save response time of the circuit, there are examples in which the LED array is divided into several units as shown in FIGS. 10(b) and 10(c) and transfer of image data is blocked. However, in even such cases, when exposure timing is simultaneous all through the LED array or when the LED array is divided into separate units and transfer of the image data is blocked, timing is completely identical too. Therefore, the inclination and curve of the LED array appear the inclination and curve of the image as they are.

Figure 11:
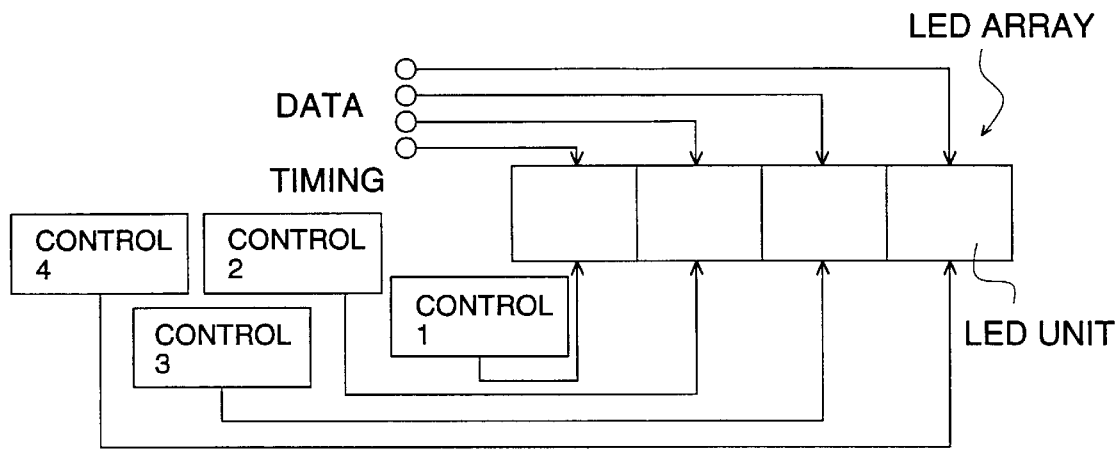
FIG. 11 is an explanatory sketch showing a control system of exposure timing of the present embodiment.

On the contrary, in the present embodiment, as shown in FIG. 11, image data are divided into separate units of the LED array to be transferred, and exposure timing of each such unit is controlled in accordance with the degree and the direction of the inclination and curve from the upstream side of the primary scanning direction. Accordingly, an image in which inclination and curve of the mounted LED array have been modified can be obtained.

Figure 5:
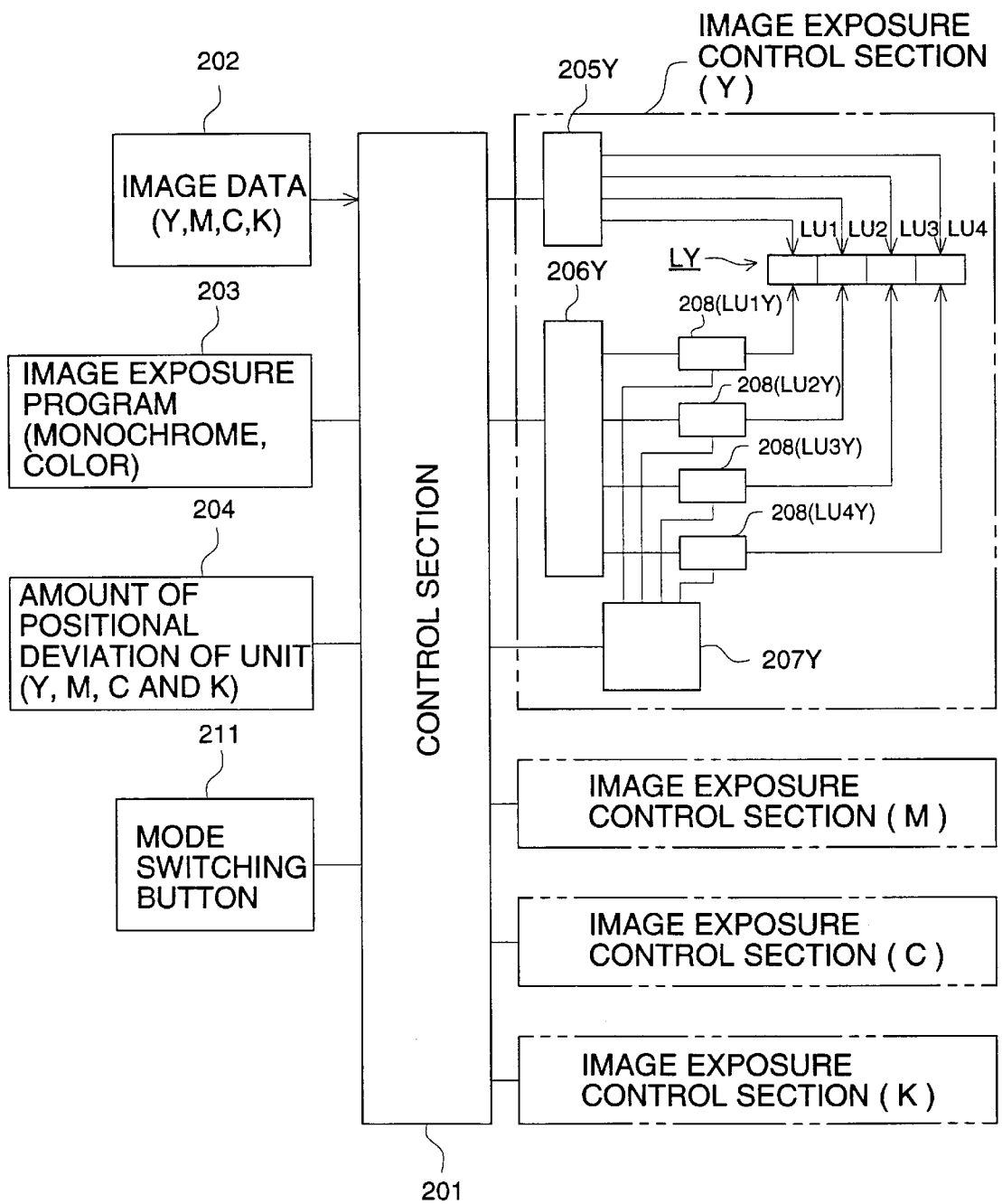
FIG. 5 is a block diagram showing a circuitry of an image exposure control section of the present embodiment.

FIG. 5 is a block diagram showing the circuit structure of the image exposure control section of the present embodiment. Image information inputted from outside the apparatus and image information read by an image reading apparatus is subjected to image processing, and subsequently, aforesaid image information is inputted into control section 201 as image data of each of Y, M, C and K colors. In ROM (1) 203, monochrome and multi-colored image exposure programs are recorded. When a monochrome mode is selected by means of mode switching button 211, the selected monochrome image exposure program is outputted to control section 201. When the color mode is selected, the image exposure programs for each of Y, M, C and K colors are outputted to control section 201.

In the present embodiment, deviation amount, when a standard LED array (LS) which will be the standard for exposure optical system 12 (explained later) and another LED array (L), for example an yellow (Y) exposure optical system 12(Y) LED array (LY) are superposed, is written in ROM (2) 204 for storage. As the standard LED array (LS), black (K) LED array (LK) is preferable.

Figure 6:
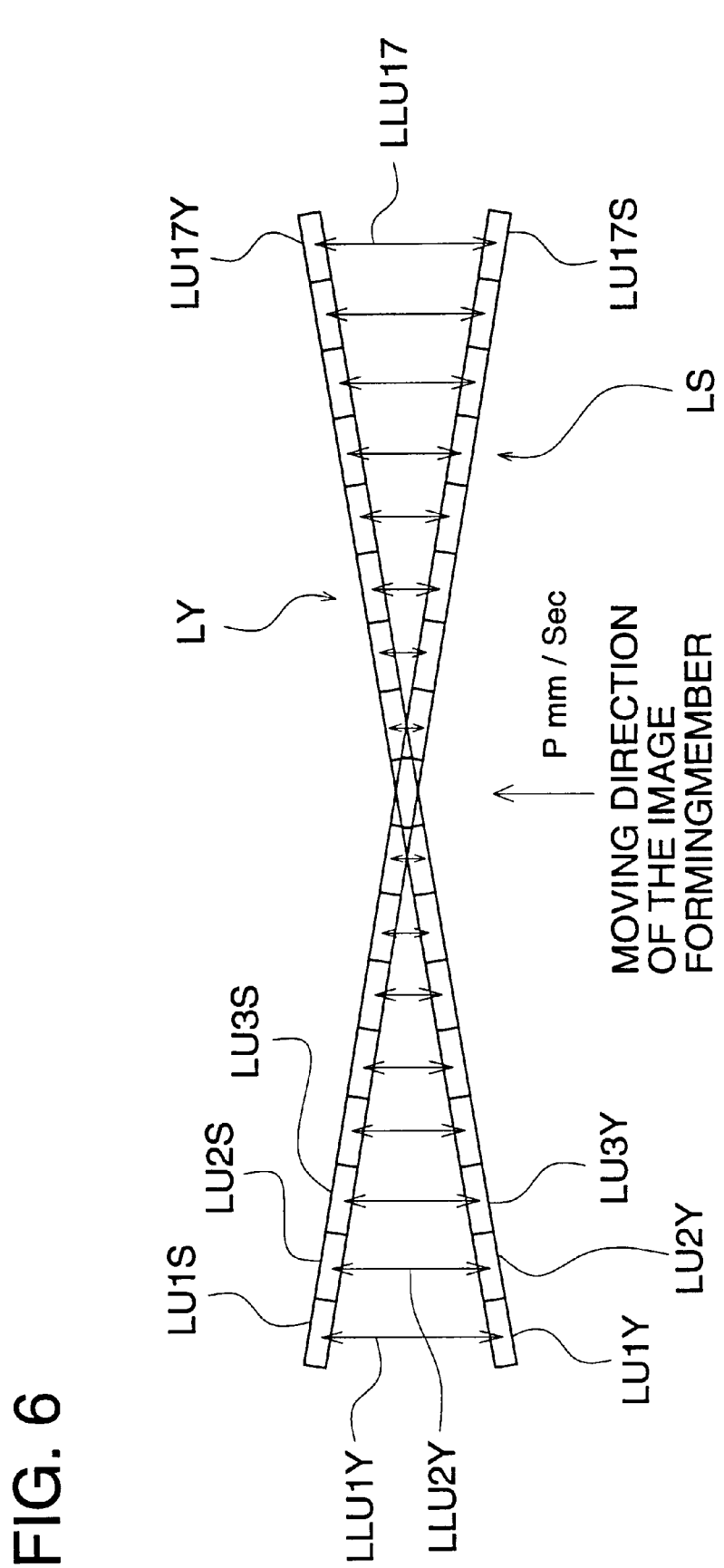
FIG. 6 is an explanatory drawing showing the relationship of deviation amount of the LED arrays.

As shown in FIG. 6, each LED array (L) is provided linearly in a direction perpendicular to movement of photoreceptor drum 10. Concurrently with this, each LED array is divided into plural units (LU), for example 17 units (in FIG. 5, the LED array is divided into four units). Each unit (LU) of the LED array (L) is named LU1, LU2, - - - LU17 successively from the left side. The deviation amount of each unit of, for example, a yellow (Y) LED array (LY) on the standard LED array (LS) is written in ROM (2) 204 as deviation amount LLU (LLU1Y, LLU2Y - - - ) of corresponding each unit (LU1Y on LU1S, LU2Y on LU2S, - - - ), after superposing, for example, central LU9 which is the standard point of exposure timing.

Aforesaid deviation amount can easily be measured when assembling and adjusting aforesaid color image forming apparatus. By writing aforesaid deviation amount in ROM (2) 204 when assembling, very little mounting adjustment is necessary when assembling the LED array (L). Time for adjustment is, thereby, noticeably reduced.

The unit deviation amount (with K as the standard) of each exposure means written in ROM (2) 204, namely,

LLU1Y, LLU2Y, - - - LLU17Y
LLU1M, LLU2M, - - - LLU17M
LLU1C, LLU2C, - - - LLU17C are outputted to control section 201 when forming a color image.

In a color image forming apparatus of the present embodiment, when forming an image, firstly a yellow (Y) image exposure is conducted on photoreceptor drum 10 which is in a charged condition.

205Y is an image data buffer section. Image data for one line is temporarily moved to image data buffer section 205Y in the form divided into each unit.

206Y is an exposure time controlling circuit. By means of an image exposure program, instruction for the timing of the start of exposure of the LED array (LY) is outputted to each of the unit exposure time correction circuits 208 (LU1Y, LU2Y, - - - ).

207Y is a unit exposure time correction control circuit. Based on deviation amount (LLU1Y, LLU2Y, - - - LLU17Y) of each unit of the LED array (LY) called from ROM (2) 204, corrected exposure time of each unit is calculated. If movement time on the circumference of photoreceptor drum 10 is P mm/sec., exposure control time of each unit (LU1Y, LU2Y, - - - LU17Y) is LLUnY/P sec. (n: 1–17). Exposure correction time calculated in such a manner that deviation amount on the upstream side compared with the moving direction of photoreceptor drum 10 is higher by LLUnY/P sec. and the deviation amount on the downstream side is lower by LLUnY/P sec. is outputted to unit exposure time correction circuit 208 (LU1Y, LU2Y, - - - LU17Y).

In unit exposure time correction circuit 208 (LU1Y, LU2Y, - - - LU17Y), exposure starting timing outputted from exposure time control circuit 206 is outputted in a form that the timing is corrected by LLUnY/P sec. Each unit of the LED array (LY) provides image exposure of the image data due to the exposure starting timing which has been subjected to the above-mentioned correction.

In the present embodiment, after yellow (Y) image exposure, image exposure is conducted in the order of magenta (M), cyan (C) and black (K). However, since black (K) LED array (LK) is the standard for the correction for the image exposure timing, it is not necessary for the black (K) image exposure control section (K) to be provided with timing correction of the image exposure.

A control method in the image formation of the present embodiment is extremely effective in color image formation when toner images are superposed on an image forming body by two or more different image exposure means. However, in the case of monochrome image formation, its effects were not observed. Accordingly, in the monochrome mode, control of exposure timing for each unit by the present embodiment can be canceled out in a color image forming apparatus explained as above, and as well, can automatically be canceled.

The apparatus and the control of the present embodiment explained so far have prominent effects in terms of minimizing deviation amount when superposing toner images. In order to simplify explanation, when a green line-shaped image is formed by superposing yellow (Y) and cyan (C) two color toner, control of exposure timing of LED array (LC) of exposure optical system 12(C) compared with LED array (LY) of exposure optical system 12(Y) will be explained.

Figure 7:
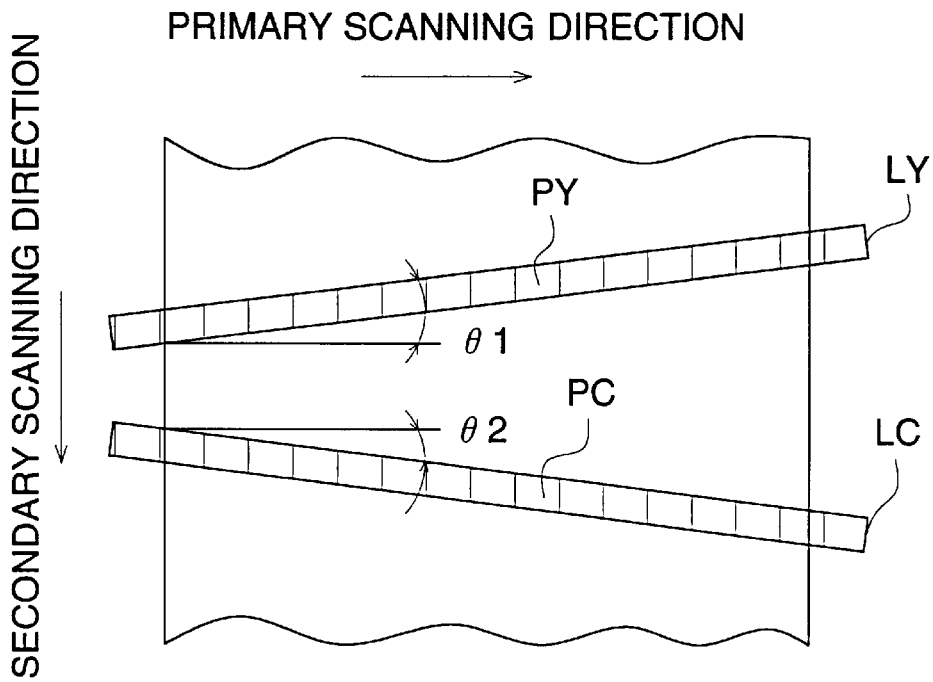
FIGS. 7(a) and 7(b) are explanatory sketches showing the results due to the control of exposure timing of the present embodiment (No. 1).
Figure 7:
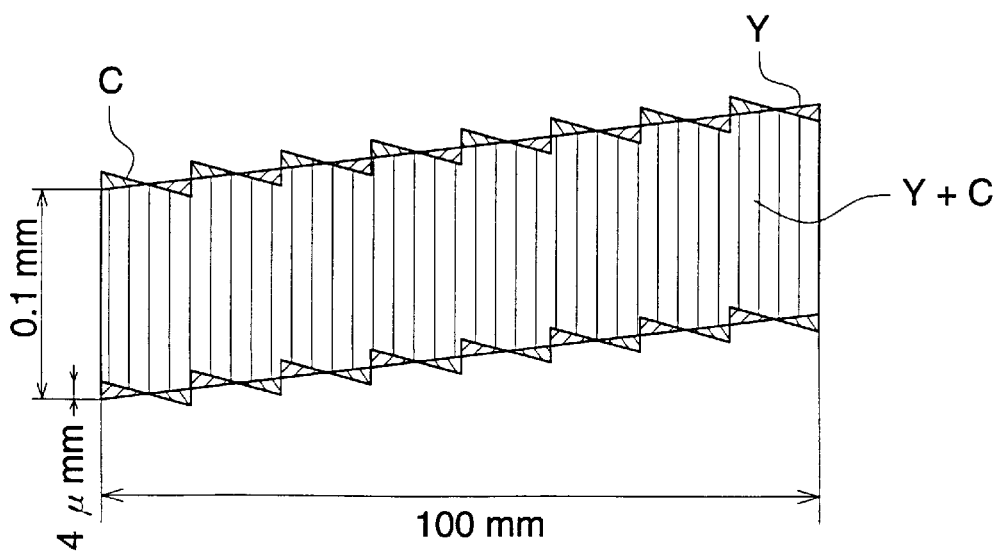

As shown in FIG. 7(a), the above-mentioned LED array (LY) and LED array (LC) are positioned at a prescribed interval in the moving direction of photoreceptor drum 10. They are linear to a direction perpendicular to the direction of drum 10. They are respectively inclining in opposite direction at angles θ1 and θ2.

Each LED (ordinarily 4 or more LEDs, and 17 LEDs in the present invention) array is divided into plural exposure units in a linear direction. With regard to LED array (LY), each exposure unit conducts image exposure at the same timing with the central exposure unit. On the other hand, with regard to the LED array (LC), after setting the central exposure unit as the standard point PC of exposure time on the above-mentioned LED array (LY), exposure control is conducted in such a manner that exposure timing coincides by means of an image exposure program, provided in advance. By preceding or retarding exposure timing, based on deviation amount inputted in advance, on image exposure by each exposure unit of the LED array (LY) which corresponds to image exposure by each of the other exposure units, as shown in FIG. 7(b), exposure timing is controlled in such a manner that the outline of green (Y+C) toner image exhibits minimally jogged edges.

For example, provided that each exposure unit is divided into 12.5 mm, and angles θ1 and θ2 of each LED array are respectively within 1 minute of each other, in a linear image of a width of 0.1 mm and a length of 100 mm formed on the circumference of photoreceptor drum 10, invisible yellow (Y) or cyan (C) monochrome area having 4 μm length at the above-mentioned jogged edges portion is mixed. In most portion, green image area in which two colors (Y+C) are superposed are formed. Therefore, a color image having high image quality in which sufficient color deviation is not observed in practical.

In addition, the above-mentioned control of the exposure timing of each of the individual exposure units of the LED array can also be utilized for the adjustment of exposure timing of a non-linear LED array as shown in FIG. 8(a).

Figure 8:
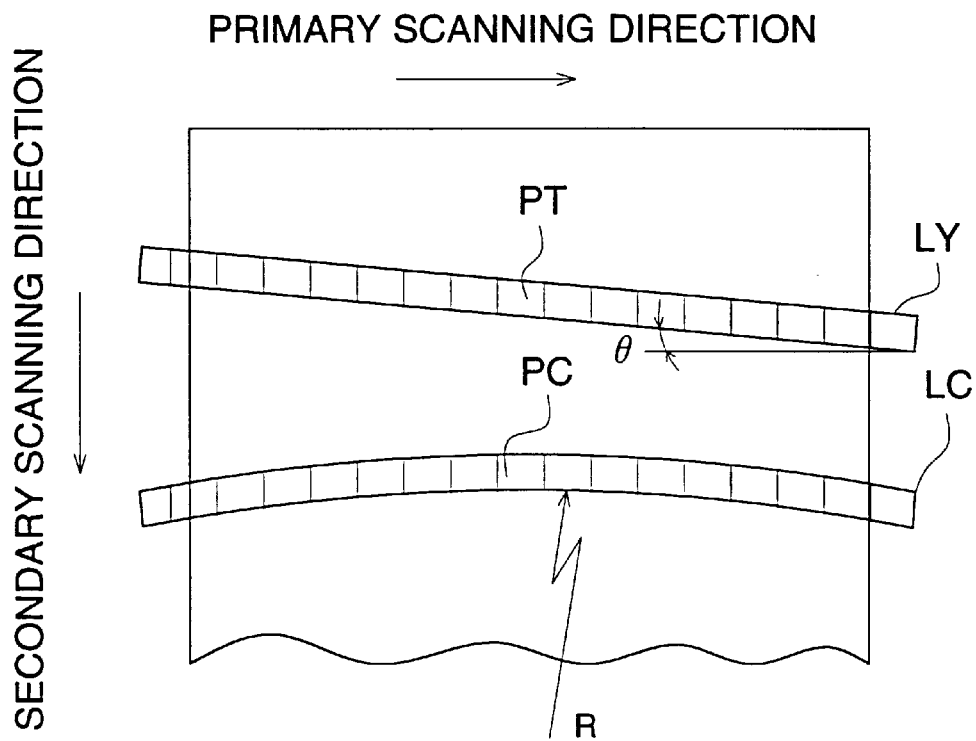
FIGS. 8(a) and 8(b) are explanatory sketches showing the results due to the control of exposure timing of the present embodiment (No. 2).
Figure 8:
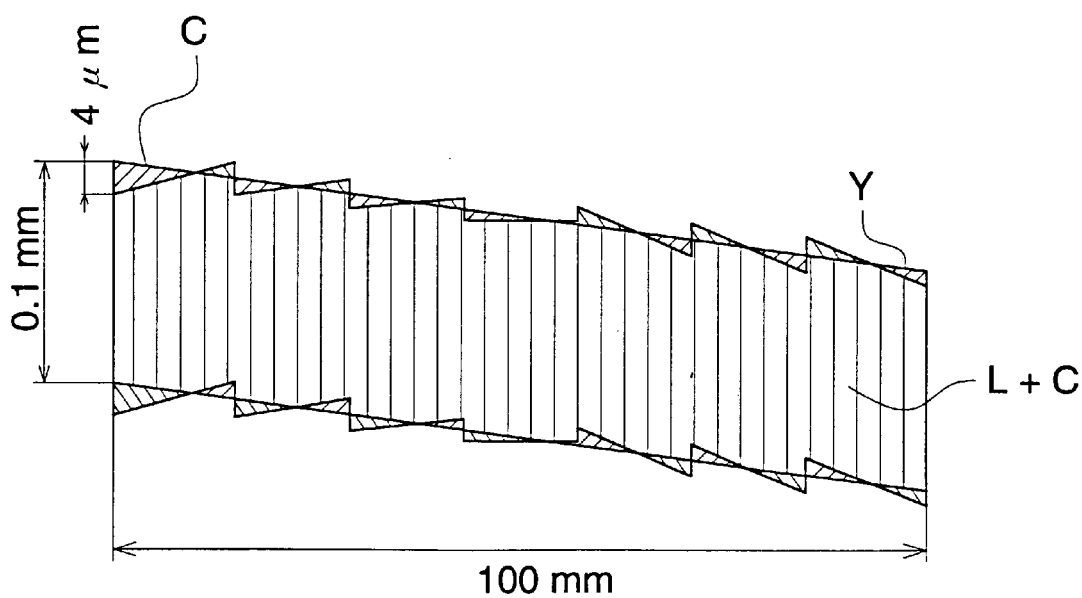

As shown in FIG. 8, LED array (LY) is inclined by an angle θ from the perpendicular to the movement of photoreceptor drum 10. On the other hand, LED array (LC) is curved with the apex of the curvature R is to the direction of the movement of drum 10.

The above-mentioned LED array (LY) and LED array (LC) divided into plural exposure units in accordance with the size of angles θ and curvature R, and in the same manner as in the preceding examples, the standard points PL and PC for the respective timing control are determined to be the central exposure units. Then, the timing of the exposure of each exposure unit on the LED array (LC) side preceded or retarded compared with the exposure timing on the image exposure of the exposure units on the LED (LY) side based on the amount of deviation and thereby the monochrome area can be reduced to size incapable of being visualizable.

Figure 9:
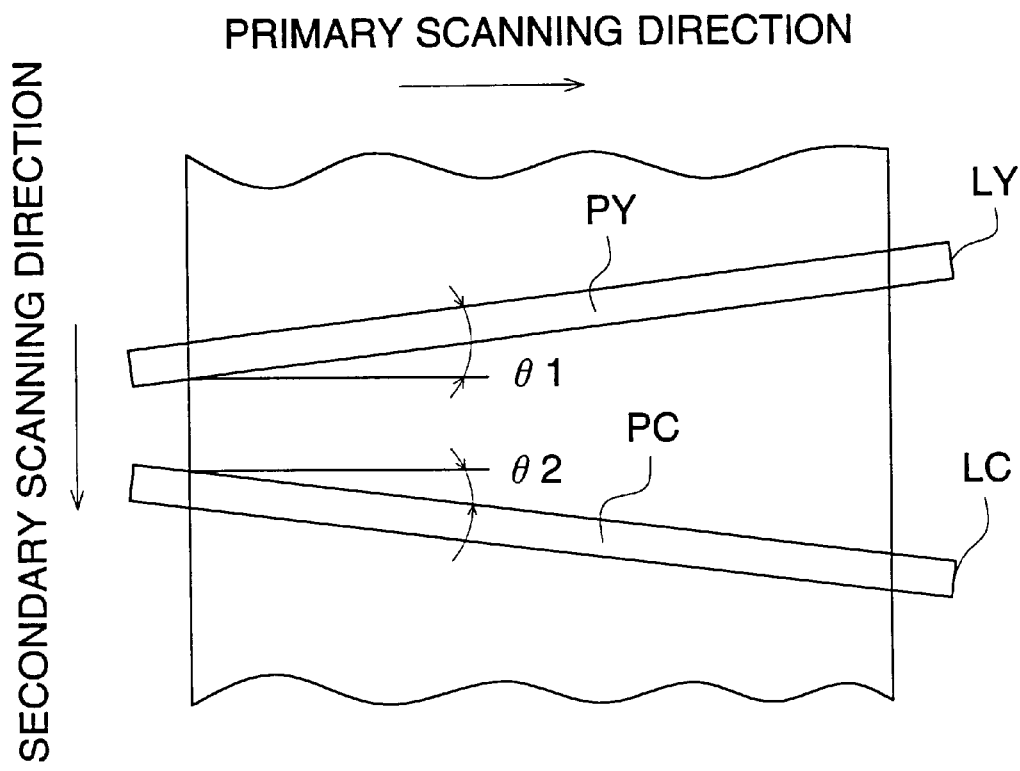
FIGS. 9(a) and 9(b) are explanatory sketches showing results by means of conventional exposure timing.
Figure 9:
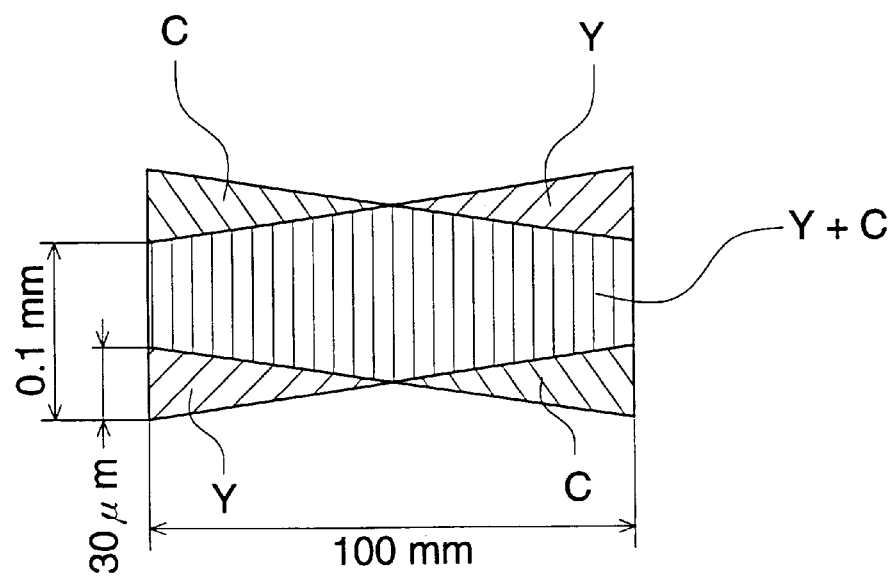

Incidentally, if the above-mentioned LED array (LY) and LED array (LC) are not divided into plural exposure units as in the conventional system as shown in FIG. 9(a) in which the control method of the present embodiment is not applied and exposure timing is controlled integrally by the central standard points PY and PC, color deviation by means of the inclination by the LED array is very prominent. When the angles of each LED array are inclined by θ1 and θ2 [one minute respectively, as shown in FIG. 9(b)], the monochrome area which occurs on an image of 0.1 mm width and 100 mm length are 30 μm on both end portions. Accordingly, color deviation is obvious and color on the image is noticeably deteriorated.

Linearity between each of plural LED arrays explained in the above-mentioned embodiment is corrected in a color image forming system as shown in FIG. 3 when aforesaid apparatus is delivered from a factory or during overhaul. However, when an image is formed, it is insufficient to correct the exposure properties in the exposure optical system of the present invention and linearity between each of plural LED arrays explained in the present embodiment. Rather, it is necessary to coincide the image exposure position in the emission unit or recording unit which correspond between plural LED arrays in the primary scanning direction, or to coincide the image exposure position in the secondary scanning direction. Aforesaid deviation in the primary scanning direction and the secondary scanning direction is deviated during stand-by timing when the power supply is turned ON, when a prescribed number of paper sheets are printed and when ambient conditions (for example, temperature) are noticeably changed from the standard conditions.

Next, correction of deviation in the primary scanning condition and/or secondary scanning direction between plural LED arrays which are conducted by shifting image data in the primary scanning direction and/or secondary scanning direction will be explained.

Figure 13:
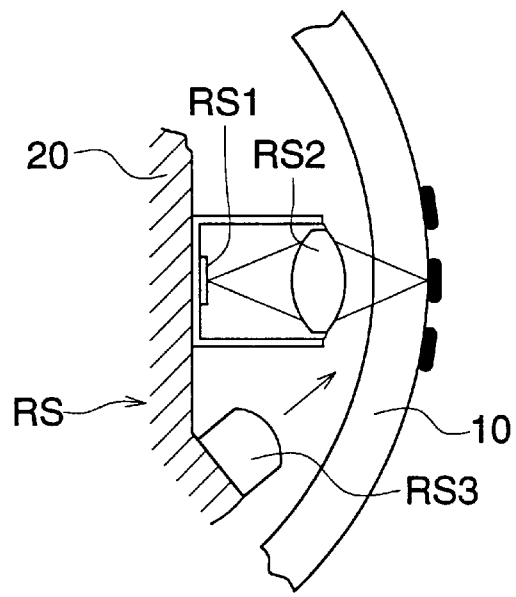
FIG. 13 shows a cross sectional view of a registration sensing means.
Figure 14:
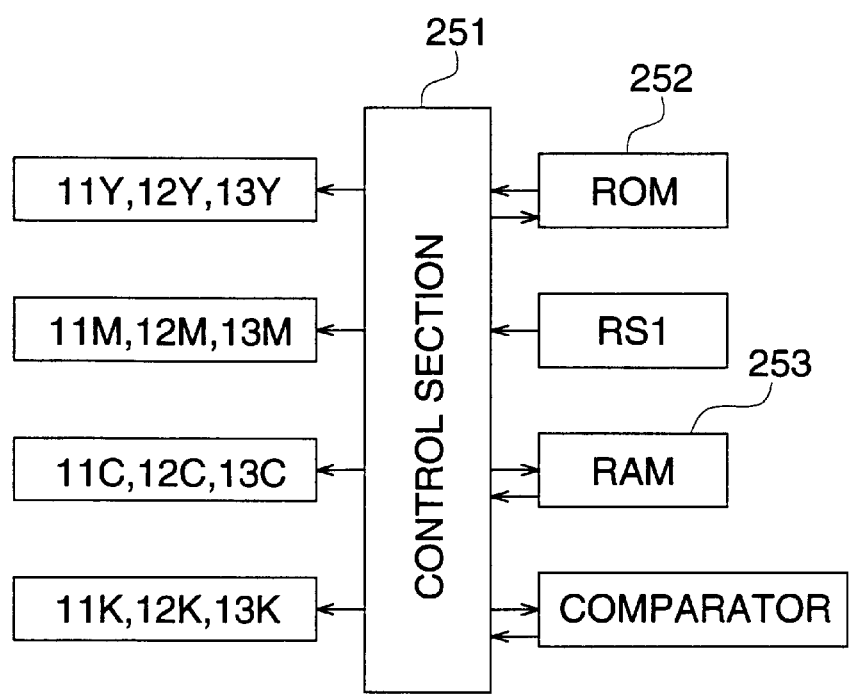
FIG. 14 is a circuit block diagram of registration correction.

In the present embodiment, inside photoreceptor drum 10, between developing device 13(K) and cleaning device 19 (downstream of developing device 13(K)), registration sensing means RS is provided on supporting member 20, by which the registration pattern formed on the circumference of photoreceptor drum 10 is sensed and registration between exposure optical systems 12(Y), 12(M), 12(C) and 12(K) are adjusted. FIG. 13 shows a cross sectional view of registration sensing means RS. FIG. 14 shows a circuit block diagram regarding registration adjustment. In FIG. 13, RS1 represents an image sensor such as a CCD. A line-type or an area-type image sensor RS1, is mounted parallel to the shaft of photoreceptor drum 10 in such a manner that the image-forming lens RS2 is provided in front of image sensor RS1, and a registration pattern image formed on the circumference of photoreceptor drum 10 is image-formed on image sensor RS1. RS3 represents a light-emitting element which illuminates the registration pattern image from the interior. As sensing beam, an infrared beam which is transmitted the substrate of photoreceptor drum 10 is preferably used. As image sensor RS1, one which has sufficient sensitivity to infrared is used. In the present embodiment, light-emitting element RS3 irradiates photoreceptor drum 10 from the interior, and by means of reflected light, registration is sensed. It is also possible that light-emitting element RS3 is provided at the exterior of photoreceptor drum 10 facing oppositely from image sensor RS1 so that registration can be sensed via transmitted light. It is preferable in terms of sensing performance that the sensing beam has a transmissive rate of 70% or more on the photoreceptor drum. In addition, it is not preferable that the photoreceptor drum does not come to have light sensitivity to aforesaid sensing beam even when there is disturbance of toner image or light fatigue of the photoreceptor.

Figure 15:
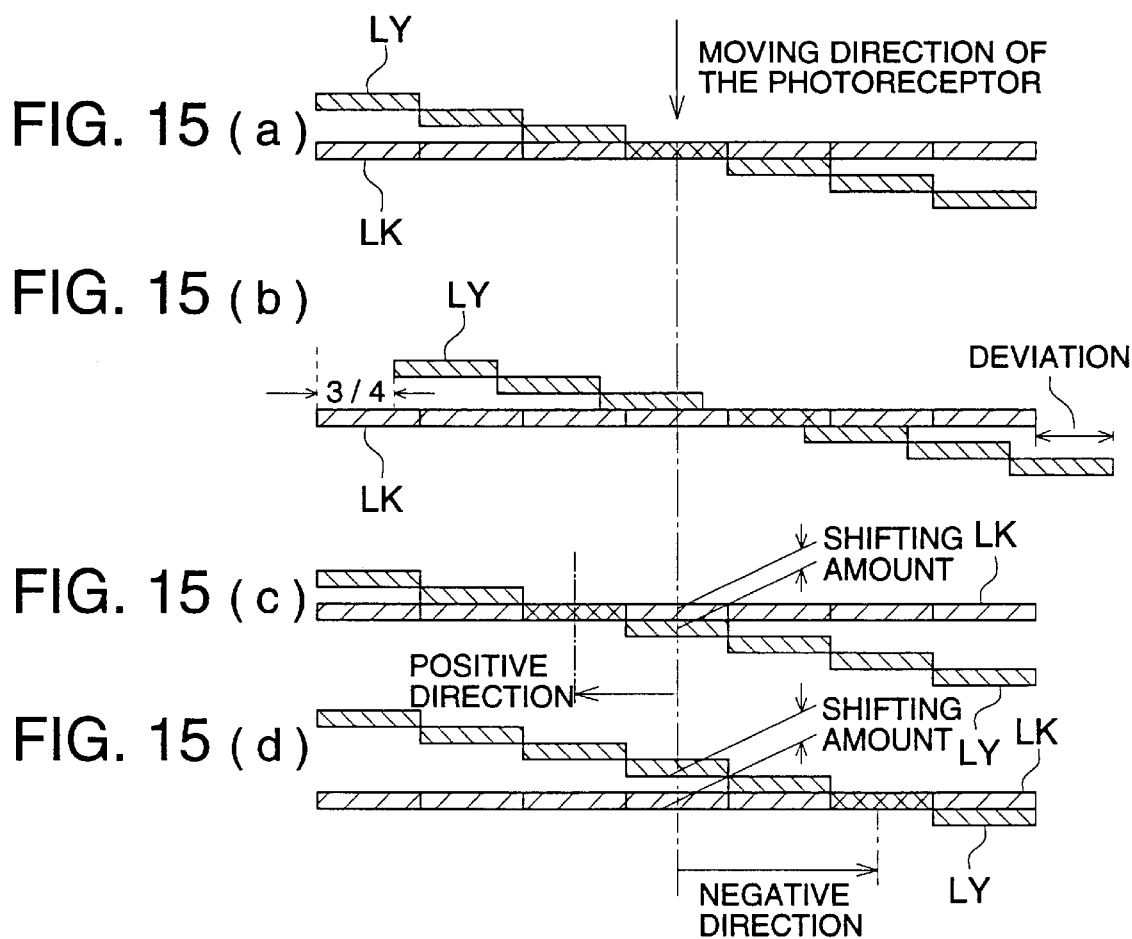
FIGS. 15(a), 15(b), 15(c) and 15(d) are explanatory sketches showing an example of a registration pattern.

When conducting registration adjustment, control section 251 in FIG. 14 retrieves a registration pattern program stored in advance from ROM 252. Control section 251 forms a registration pattern on photoreceptor drum 10. After photographic processing, registration is sensed by means of registration sensing means RS, and then, image deviation is corrected by means of control section 251. FIG. 15 shows an example of a resistration pattern, in which, the black color (K) which is mostly stressed as the standard of the image, the registration pattern in such a manner that deviation amount of yellow (Y), magenta (M) and cyan (C) in the primary scanning direction and/or the secondary scanning direction on black color (K) can subsequently also be sensed. Deviation amount in terms of the primary scanning direction and/or the secondary scanning direction of yellow (Y) on black (K) is easily sensed by recording a stepped yellow line (LY) in which lit pixel of the LED is deviated for each line over a single solid black line (LK) in the primary scanning direction and by sensing the ends of both lines and their crossing position. Positional deviation of the end of one line image in the longitudinal axis of the photoreceptor represents deviation in the primary scanning direction. Next, correcting in terms of the secondary scanning direction is explained. FIG. 15($a$) represents a resistration pattern of 100% superposing where there is no deviation amount of yellow (Y) on black (K) in terms of the primary scanning direction and the secondary scanning direction. FIG. ($b$) shows a case when a yellow (Y) line is deviated by ¾ pixel in terms of the LED emission unit. FIG. 15($c$) represents deviation in the positive direction in the secondary direction and deviation amount of yellow (Y). FIG. 15($d$) represents deviation in the negative direction in the secondary scanning direction and deviation amount of yellow (Y). Based on deviation direction and deviation amount of each color sensed by image sensor RS1, control section 251 calculates the amount of deviation to be corrected, which it then records on RAM 253. When forming an image, deviation in terms of the primary scanning direction is corrected by deviating the image data outputting. Control section 251 shifts outputting timing for each of exposure optical system 12(Y), 12(M) and 12(C) for registration correction in such a manner as to offset for the sensed deviation direction and deviation amount with regard to the deviation in the secondary scanning direction.

Figure 16:
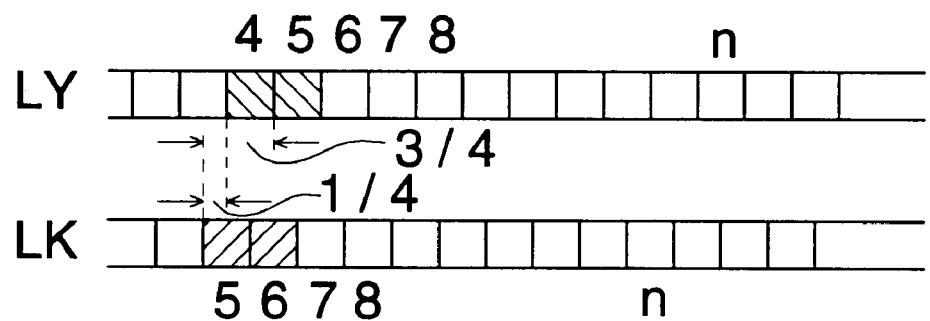
FIG. 16 is an explanatory sketch showing an example of deviation correction.

FIG. 16 is an illustration showing a correction method of the deviation in the primary scanning direction. In an example shown by FIG. 16, one pixel, which is a recording unit, is divided into 4 (2×2) small sub-pixels. By means of 4 emission elements, one sub-pixels is formed. In FIG. 15($b$), in which a yellow image is deviated from a black image by ¾ pixel in the primary scanning direction, when the first pixel of the black image is formed by emission element Nos. 5 and 6, deviation of half pixels of Nos. 4 and 5 can be corrected by shifting image data in such a manner that the first pixel of the yellow image is formed by emission elements of Nos. 4 and 5. In FIG. 16, deviation in terms of pixel unit is corrected to ¼. In the present invention, as described before, the width of image formation at 0.5 of the maximum light amount is wider than the installed width of one emission element and narrower than the recording width of one pixel. Therefore, even after the above-mentioned image deviation is corrected, aforesaid correction is not evident in terms of image quality.

The example of the present correction was applied to the deviation sensed from the registered pattern. However, it can be applied to the deviation measured when the image forming apparatus is assembled and adjusted.

By providing a registration sensing means and by conducting registration correction as necessary, owing to an image forming apparatus employing an exposure optical system of the present invention explained so far, wherein linearity of the LED array is corrected, a vivid image excellent in terms of reproducibility is realized. The exposure optical system of the present invention is not limited to LED, FL or EL also can be used for the exposure optical system.

Owing to the present invention, in an image forming apparatus employing an LED array which conducts multi-value modulation, positional correction and light amount correction become possible on each of the several light-emitting units. The occurrence of uneven streaking and uneven light amount due to poor accuracy of the LED array are eliminated. A multi-value latent image having no positional deviation and no uneven light amount are formed.

By providing the present invention in an image forming apparatus wherein a color image is formed by providing plural LED arrays near the photoreceptor drum, and by providing a means for shifting image data in the primary scanning direction and/or a secondary scanning direction, a multi-gradation and sharp with highly accurate registration is obtainable.

What is claimed is:

1. An image forming apparatus, comprising:

an image forming member on which an image is formed pixel by pixel for each image data, wherein each pixel has a maximum recording width;

an exposure array in which a plurality of light emitting elements and a plurality of image focusing elements are aligned in an array form and each light emitting element is mounted with a setting width, wherein each light emitting element has a mount-shaped light amount distribution curve in which light amount data spread to both sides of a peak corresponding to the maximum light amount; and control means for dividing each pixel into plural small pixels corresponding to plural neighboring light emitting elements and for controlling the plural neighboring light emitting elements in accordance with the image data of each pixel so that an image of each pixel is formed in the maximum recording width of each pixel by the plural neighboring light emitting elements, wherein an image forming width at the light amount of 50% of the maximum light amount of each light emitting element is wider than the setting width of the light emitting element and is narrower than the maximum recording width of each pixel.

2. The image forming apparatus of claim 1, wherein the control means divides the image data of each pixel into plural image data with density pattern method by the use of threshold values in a matrix of (m×n).

3. The image forming apparatus of claim 1, wherein the threshold values are arranged in the matrix of 2×2 so that the plural small pixels and the plural neighboring light emitting elements are formed in the matrix of 2×2.

4. The image forming apparatus of claim 3, wherein the plurality of light emitting elements has a setting density of 2400 dpi and the image is formed with a pixel density of 600 dpi.

5. The image forming apparatus of claim 1, wherein the image forming member is moved in a moving direction and the exposure array is located in a primary scanning direction perpendicular to the moving direction and the control means comprises registration detecting means to detect registration error of the array-aligned light emitting elements in the primary scanning direction and wherein when the registration detecting means detects a registration error, the control means shifts the position of the plural neighboring light emitting elements for each pixel so as to eliminate the registration error.

6. The image forming apparatus of claim 5, wherein the apparatus comprises a plurality of the exposure arrays for yellow, magenta, cyan, and black toner image, and wherein the registration detecting means detects registration error of the exposure arrays for yellow, magenta and cyan toner image with reference to the position of the exposure array for black toner image.

7. The image forming apparatus of claim 6, wherein the image forming member is shaped in a drum whose internal surface is made of a transparent material and the plurality of the exposure arrays and the registration detecting means are provided inside the drum.

8. The image forming apparatus of claim 7, wherein the registration detecting means comprises a light source to irradiate light from the inside of the drum onto a toner image formed on an external surface of the drum and a reading elements to read the toner image by receiving the light reflected from the toner image.

9. The image forming apparatus of claim 8, wherein the light irradiated from the light source is an infrared ray.

10. The image forming apparatus of claim 1, wherein the plurality of light emitting elements are one of FL, EL and LED elements.

* * * * *